Dec. 8, 1925.
L. E. HILDEBRAND
1,564,788
SYSTEM FOR THE TRANSMISSION OF ANGULAR MOTION
Filed June 16, 1922
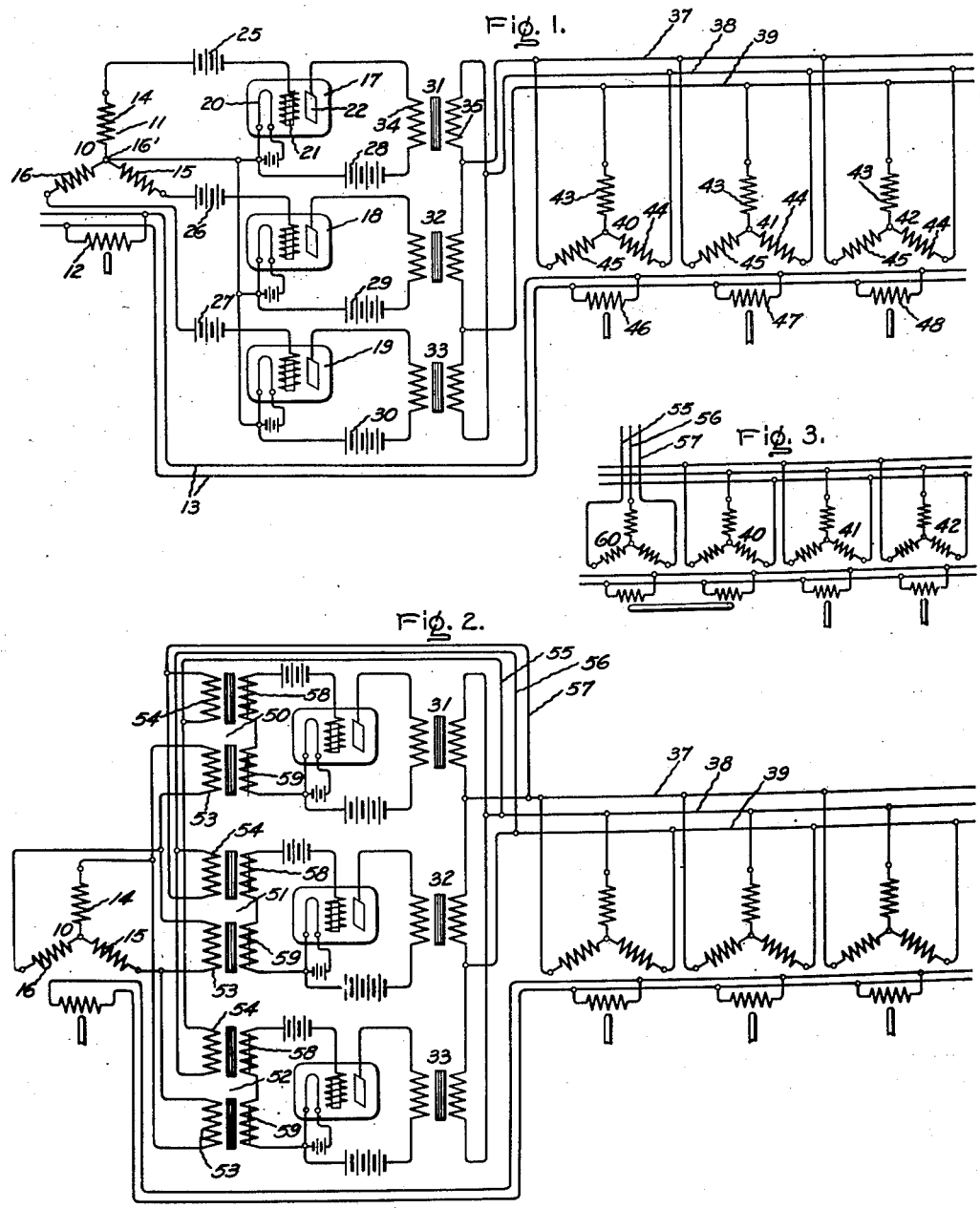
Inventor:
Lee E. Hildebrand,
by *Albert S. Davis*
His Attorney.

Patented Dec. 8, 1925.

1,564,788

UNITED STATES PATENT OFFICE.

LEE E. HILDEBRAND, OF CLIFTONDALE, MASSACHUSETTS, ASSIGNOR TO GENERAL ELECTRIC COMPANY, A CORPORATION OF NEW YORK.

SYSTEM FOR THE TRANSMISSION OF ANGULAR MOTION.

Application filed June 16, 1922. Serial No. 568,878.

*To all whom it may concern:*

Be it known that I, LEE E. HILDEBRAND, a citizen of the United States, residing at Cliftondale, in the county of Essex, State of Massachusetts, have invented certain new and useful Improvements in Systems for the Transmission of Angular Motion, of which the following is a specification.

My invention relates to systems for the transmission of angular motion and has for its object the provision of means for amplifying the output of the transmitting device.

My invention is particularly applicable to "selsyn" systems for the transmission of angular motion, although it obviously has application to various other systems of this character.

In the application of systems for the transmission of angular motion it is often desirable to reproduce the motion being transmitted simultaneously at a plurality of receiving stations. This may be accomplished by connecting a plurality of receiving devices directly to the transmitting device. With this method, however, the transmitting device must be designed with a capacity sufficient to operate all of the receiving devices connected to it, which is often a disadvantage, particularly where economy in the space occupied by the transmitting device is of primary importance. Another disadvantage in certain systems, such as the selsyn system, is that the torque required to operate the transmitting device becomes excessive with increased capacity. In accordance with my invention I provide means for amplifying the power output of the transmitting device for the operation of any desired number of receiving devices whereby the transmitting device need have a capacity sufficient only to control the amplified output to the receiving circuit. In carrying out my invention in one form I provide vacuum or electron tubes for amplifying the output of the transmitting device so as to supply the required amount of energy to the receiving circuit.

For a better understanding of my invention reference should be had to the accompanying drawing in which Fig. 1 is a diagrammatic view of a system for the transmission of angular movement embodying my invention; Fig. 2 is a diagrammatic view showing a modified form of my invention; while Fig. 3 is a diagrammatic view of a modification of the arrangement shown in Fig. 2.

Referring to the drawing, I have shown my invention in one form as applied to the "selsyn" system for the transmission of angular motion. In the arrangement shown in Fig. 1, the transmitting device 10 comprises a poly-circuit armature winding 11 and a cooperating single phase field winding 12 which is supplied from a suitable source of alternating current 13. The armature winding 11 is mounted on the stator member and the field winding on the rotor member, although this relation may be reversed. The armature winding is physically similar to a polyphase induction motor or alternating current generator winding. It comprises three windings 14, 15 and 16 connected in Y to a neutral point 16'. Obviously, however, my invention is not limited to a three circuit armature winding nor to the Y connection. Connected between the terminals and neutral point of the windings 14, 15 and 16 respectively are the grid or input circuits of three vacuum tube amplifiers 17, 18 and 19, which are of three-electrode type each having a filament 20, a grid 21 and a plate 22. Obviously, various other types of vacuum tubes may be used. As shown in the drawing, the neutral point 16' is connected directly to the filaments 20 of the vacuum tubes while the terminals of the windings 14, 15, and 16 are connected to the grids 21 of the tubes 17, 18, and 19 respectively. Preferably a suitable source of direct current is connected in each grid circuit, such as batteries 25, 26, and 27 whereby the tubes can be adjusted in a well known manner. The plate or output circuits of the tubes 17, 18, and 19 are energized by suitable means, such as batteries 28, 29, and 30. Connected in the plate circuits respectively are similar transformers 31, 32, and 33 each having a primary winding 34 and a secondary winding 35, the voltage ratio of which may be 1:1. The secondary windings 35 may be and are shown as connected in delta relation to the receiving circuit mains 37, 38, and 39.

Any desired number of receiving devices may be connected to the receiving mains 37, 38, and 39. Three such receiving devices 40, 41, and 42 are shown thus connected. The receiving devices are similar to the transmitting device 10. They are provided with three circuit armature windings each comprising windings 43, 44, and 45 connected in Y relation, and with single phase field windings 46, 47, and 48 connected to the supply source 13.

As thus constructed and arranged electromotive forces are induced in the windings 14, 15, and 16 of the transmitting device 10 by the cooperating field winding 12. The values of the electromotive forces induced in the various windings depend upon the angular position of the field winding with relation thereto. These electromotive forces are impressed respectively on the grid circuits of the vacuum tubes, and since they are alternating, having the frequency of the supply source 12, pulsations of a similar frequency are set up in the plate circuit currents supplied by batteries 28, 29, and 30. In effect therefore an alternating current of equal frequency and varying in value in proportion to the electromotive force induced in the corresponding armature winding is superimposed on the plate current of each of the vacuum tubes. These superimposed currents in turn induce electromotive forces in the transformers 31, 32, and 33, which electromotive forces are impressed on the receiving circuit mains 37, 38, and 39. Electromotive forces having the same relation as the electromotive forces induced in the armature windings 14, 15, and 16, are thus impressed on the receiving circuit mains. By choosing suitable apparatus these electromotive forces may be made equal or in any desired ratio to the electromotive forces induced in the armature windings. When the rotors of the receiving devices each stand in an angular position corresponding to the position of the transmitting devices 10, the electromotive forces induced in the armature windings of the receiving devices by their respective field windings are equal and opposed to the electromotive forces impressed on the receiving circuit under the control of the transmitting device.

Upon movement of the rotor of the transmitting device 10, the values of the electromotive forces induced in the armature windings of the transmitting device are changed and these new electromotive force values are transmitted as previously described through the vacuum tubes to the receiving circuit mains 37, 38, and 39. This causes an unbalanced electromotive force condition between the receiving devices and their supply mains with the result that equalizing currents are set up in the armature windings of the receiving devices whereby torques are exerted on their rotors tending to turn them to positions in which the electromotive forces balance. The receiving devices are thus caused to reproduce any movement imparted to the transmitting device. It will be observed that the operating energy for the receiving device is supplied from the plate circuit batteries. Since the function of the transmitting device is to only control this supply of energy, the transmitting device is subjected to only a very small load so that a number of receiving devices can be operated under the control of a single transmitting device. The transmitting device need only have sufficient capacity to supply the grid currents necessary for the proper control of the power supply from the plate circuit batteries.

The transformers 31, 32, and 33 may be dispensed with in certain cases. When the transformers are not used, it will be observed that the receiving devices will be traversed by the total amounts of the plate currents. With the transformers, however, the receiving devices are traversed by only the alternating currents transmitted through the transformers and derived from the pulsating plate currents. These currents are zero when the receiving devices are in angular agreement with the transmitting device. Advantage may be taken of this to obtain increased torque in the receiving devices or to decrease their size.

It will be observed that the accuracy of operation of this arrangement will depend to a large extent on the relative characteristics of the vacuum tubes and transformers, since any distortion of the relation of the transmitting device electromotive forces in their transmission to the receiving circuit will result in angular disagreement between the receiving devices and the transmitting device. Exactly similar tubes and transformers should therefore be used.

In the modified form of my invention shown in Fig. 2 I have applied the differences in the electromotive forces of the transmitting device and the receiving devices to the grid circuits of the vacuum tubes. It will be understood that when the transmitting and receiving devices are in angular agreement, their electromotive forces are equal and opposed, and hence in such case with this modification of my invention no electromotive forces will be applied to the grid circuits of the vacuum tubes. Under these conditions no pulsating currents will be set up in the plate circuits of the tube and therefore no electromotive forces will be transmitted to the receiving circuit.

In carrying out this form of my invention I provide three pairs 50, 51, and 52 of transformers, the voltage and other characteristics of the transformers in each pair being similar. The primary windings 53 of the pairs 50, 51, and 52 are connected respectively across the terminals of armature windings 14, 15, and 16, while the primary windings 54 of the pairs 50, 51, and 52 are connected through conductors 55, 56, and 57 to the receiving circuit mains supplied by transformers 31, 32, and 33 respectively. The secondary windings 58 and 59 of each pair of transformers are connected in series and in opposition to each other in the grid circuit of the respective vacuum tubes.

In the operation of this modification of my invention, it will be observed that the receiving devices impress their electromotive forces on the primary windings 54 while the transmitting device impresses its electromotive force on the primary windings 53. When the receiving devices are in angular agreement with the transmitting device, these electromotive forces are such that the secondary windings 58 and 59 of each pair exactly neutralize each other so that no electromotive forces are impressed on the grid circuits of the vacuum tubes. As a result, the vacuum tubes will be inactive and no energy will be supplied to the receiving circuit so that under these conditions the receiving devices will remain at rest and in positions of angular agreement. The tubes preferably are adjusted by regulating the grid batteries to give the necessary negative grid potential so that when the two secondary windings connected in each grid circuit neutralize each other, the plate current in that tube will be zero.

Upon movement of the rotor of the transmitting device, the voltages across the terminals of the transmitting device will be changed in relation whereby one or the other of the interconnected secondary windings 58 and 59 of the pairs of transformers 50, 51, and 52 will predominate with the result that the difference in potential of each pair will be applied to the grid circuit of the respective vacuum tubes. Pulsating currents are thereupon set up in the plate circuits of the vacuum tubes whereby transformers 31, 32, and 33 are caused to impress electromotive forces on the receiving circuit, which electromotive forces are either higher or lower than the respective voltages of the transmitting devices, as the case may be. In value these electromotive forces have the same or nearly the same relation as the electromotive forces generated in the transmitting device 10 and hence do not balance the electromotive forces of the receiving devices. Currents flowing through the armatures of the receiving devices are thus set up whereby torques are exerted on the rotors of the receiving devices which tend to turn them to positions to establish a balanced electromotive force condition. As the receiving devices move toward angular agreement with the transmitting device the electromotive forces impressed on the secondary windings 58 are correspondingly changed to approach a balance with secondary windings 59, and when the receiving devices come into angular agreement the pairs of secondary windings will be balanced and the vacuum tubes consequently inactive. The receiving devices are thus caused to reproduce any movement applied to the transmitting device.

The arrangement shown in Fig. 2 has the advantage that the accuracy of operation is entirely independent of the characteristics of the vacuum tubes and the transformers. Thus even though the electromotive forces induced in the transmitting device are distorted in their transmission to the receiving circuit, this condition is overcome when the receiving devices come into angular agreement with the transmitting device for the reason that with such a condition of angular agreement the transformers and detector tubes are inactive and hence cannot affect the accuracy of the system.

It will be observed that in this modification of my invention the excitation of transformers 31, 32, and 33 and also for one transformer of each of the pairs 50, 51, and 52, the primary windings 54 of which are connected to the receiving circuit, is supplied by the receiving devices. The exciting current for the other transformers of the pairs 50, 51, and 52 is supplied by the transmitting device. In the event that this load is in any way a disadvantage, it may be supplied by a separate receiving device floating on the circuit in question as described and claimed in my copending application, Ser. No. 522,650, filed December 15, 1921.

In Fig. 3 I have shown a modification of the form of my invention disclosed in Fig. 2. In this modification the primary windings 54 of the pairs of transformers 50, 51, and 52, instead of being connected directly to the receiving circuit mains 37, 38, and 39 as shown in Fig. 2 are connected through conductors 55, 56, and 57 to an auxiliary selsyn generator or transmitting device 60 which is direct connected to a selsyn motor or receiving device 40. The relation between generator 60 and its driving motor 40 is such that the relation of the generator electromotive force is always exactly the same as the relation of the receiving circuit electromotive forces impressed on the driving motor 40. It will thus be evident that the operation of this modification of my invention will be similar to the arrangement shown in Fig. 2, but it will have the advantage that certain oscillations which occur in the receiving circuit may be damped out by the motor generator set 40, 60. Obviously, if desired, the capacities of motor 40 and generator 60 can be so designed that the other receiving motors 41 and 42 may be connected to the generator 60 instead of to the receiving circuit.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. A system for the transmission of angular motion comprising electrical transmitting and receiving devices provided with moving elements, said devices having electromotive forces varying in accordance with the angular positions of their moving elements, and means responsive to the electromotive forces of both of said devices for supplying operating energy to said receiving device so as to cause said receiving device to reproduce the movement of said transmitting device.

2. A system for the transmission of angular motion comprising a transmitting device provided with stator and rotor members, a polycircuit armature winding on one of said members, a field winding on the other of said members, a receiving device similar to said transmitting device, a source of alternating current supply connected to the field windings of said devices whereby electromotive forces are induced in the circuits of the armature windings of said devices bearing a relation to each other dependent upon the angular relation of the respective field windings to said armature windings and a plurality of vacuum tube amplifiers each responsive to the two electromotive forces induced in similar circuits of the armature windings of said devices for supplying operating energy to the armature winding of said receiving device, whereby said receiving device is caused to repeat the movements of said transmitting device.

3. A system for the transmission of angular motion comprising electrical transmitting and receiving devices, said devices having electromotive forces induced therein varying in accordance with the angular position of their moving elements, and means responsive to the difference in the electromotive forces of said devices for supplying operating energy so as to cause said receiving device to reproduce the movement of said transmitting device.

4. A system for the transmission of angular motion comprising a transmitting device provided with stator and rotor members, a polycircuit armature winding on one of said members, a field winding on the other of said members, a receiving device similar to said transmitting device, a source of alternating current supply connected to the field windings of said devices whereby electromotive forces are induced in the circuits of the armature windings of said devices bearing a relation to each other dependent upon the angular relation of the respective field windings to said armature windings, and amplifying means responsive to the differences in the electromotive forces induced in similar circuits of said armature windings for supplying operating energy to the armature winding of said receiving device, whereby said receiving device is caused to repeat the movements of said transmitting device.

5. A system for the transmission of angular motion comprising electrical transmitting and receiving devices provided with moving elements, said devices having electromotive forces induced therein varying in accordance with the angular position of their moving elements, a vacuum tube amplifying device having input and output circuits, means for impressing the difference in the electromotive forces induced in said transmitting and receiving devices on the input circuit of said vacuum tube, and electrical connection between the output circuit of said vacuum tube and said receiving device whereby energy is supplied to cause said receiving device to repeat the movements of said transmitting device.

6. A system for the transmission of angular motion comprising transmitting and receiving devices each being provided with rotor and stator members, polycircuit armature windings and field windings for said devices, a source of alternating current supply for said field windings, a plurality of vacuum tubes having input and output circuits, means for impressing the differences in the electromotive forces induced in similar circuits of said armature windings on the input circuits of said vacuum tubes, and electrical connections for supplying energy to the armature winding of said receiving device from the output circuits of said vacuum tubes whereby said receiving device is caused to repeat the movements of said transmitting device.

7. A system for the transmission of angular motion comprising an alternating current transmitting device, an alternating current receiving device, said devices having electromotive forces induced therein varying in accordance with the angular position of their moving elements, a vacuum tube, and electrical connections including transformers whereby the difference in the electromotive forces of said devices is impressed on the input circuit of said vacuum tube, and electrical connections between the output circuit of said vacuum tube and said receiving device whereby operating energy is supplied from said output circuit in response to said difference in electromotive force so as to cause said receiving device to reproduce the movement of said transmitting device.

8. A system for the transmission of angular motion comprising a transmitting device, relatively movable armature and field windings for said device, a source of alternating current supply for said field winding whereby electromotive forces are induced in said armature winding bearing a definite relation to the angular relation of said windings, a receiving device similar to said transmitting device, a vacuum tube, electrical connections including transformers between the armature windings of said devices and the input circuit of said vacuum tube, said connections being such that the difference in the electromotive forces induced in the armature windings of said devices is impressed on said input circuit, and electrical connections between the output circuit of said vacuum tube and said receiving device whereby operating energy is supplied from said output circuit in response to said difference in electromotive force so as to cause said receiving device to reproduce the movement of said transmitting device.

9. A system for the transmission of angular motion comprising a transmitting device, a receiving device, polycircuit armature windings for said devices, field windings cooperating with said armature windings and rotatable with relation thereto, a source of alternating current supply for said field windings whereby related electromotive forces are induced thereby in the circuits of said armature windings, said electromotive forces varying in accordance with the angular relation of said field windings with respect to said armature windings, a plurality of vacuum tubes, pairs of transformers having their primary windings connected respectively to like pairs of terminals of said armature windings and their secondary windings connected in opposition in the input circuits of said vacuum tubes, and electrical connections between the output circuits of said tubes and the armature winding of said transmitting device, whereby operating energy is supplied from said output circuits to said receiving device so as to cause its field winding to rotate and establish a balanced electromotive force condition, whereby said receiving device is caused to reproduce the movement of said transmitting device.

In witness whereof I have hereunto set my hand this 13th day of June, 1922.

LEE E. HILDEBRAND.